Figure 2:
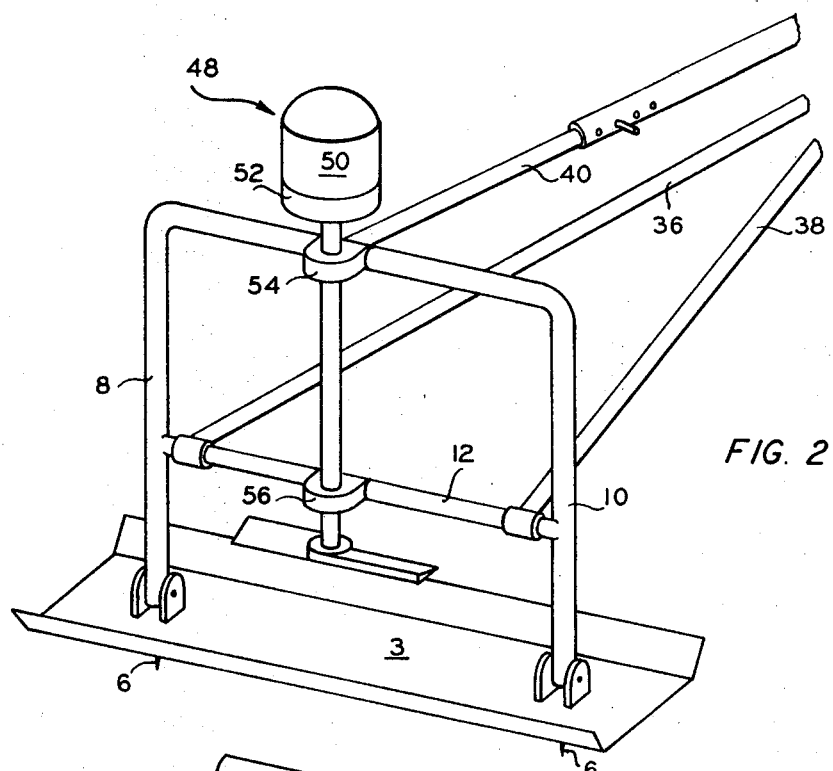

United States Patent

[11] 3,603,699

| [72] | Inventors | Budd Joe Brashear<br>239 N.E. Queenstown;<br>Donald Max Stapleton, 216 N.E.<br>Queenstown, both of Bartlesville, Okla.<br>74003 |
|---|---|---|
| [21] | Appl. No. | 19,640 |
| [22] | Filed | Mar. 16, 1970 |
| [45] | Patented | Sept. 7, 1971 |

[54] LIQUID AGITATOR
11 Claims, 2 Drawing Figs.

[52] U.S. Cl. .................................................... 416/171,
261/87
[51] Int. Cl. ........................................................ C10j 1/18,
B01f 7/24
[50] Field of Search ............................................ 416/9, 171;
61/1; 261/87, 91; 415/2

[56] References Cited
UNITED STATES PATENTS

| 3,192,898 | 7/1965 | Oster | 261/87 |
|---|---|---|---|
| 3,373,821 | 3/1968 | Sare | 416/171 |

Primary Examiner—Martin P. Schwadron
Assistant Examiner—C. Schimikowski
Attorney—J. E. Phillips ABSTRACT: A readily portable and adjustable apparatus having an agitating means for contacting and agitating a liquid, adjusting arm elements for porting, positioning and adjusting said agitating means in said liquid, and a power source in operable association with said agitating means. Said power source can be a wind motor, an electric motor or combinations thereof.

PATENTED SEP 7 1971

3,603,699

INVENTORS
B. J. BRASHEAR
D. M. STAPLETON
BY
J. E. Rhierson

LIQUID AGITATOR

This invention resides in a novel, readily movable and readily adjustable agitating means for agitating a liquid. In one aspect, this invention resides in an apparatus which is both easily moved and positioned and yet readily adjustable to permit the realigning of an agitating means relative to a liquid body so as to effect agitation thereof.

In many areas, the watering of livestock in winter is greatly complicated by freezing conditions which often prevail which cause the formation of an ice barrier on the water source, such as a stockpond, which must be removed to provide the livestock with access to the water. To overcome this problem of ice formation, pond mills were previously utilized which agitate the water of the stockpond to prevent it from freezing. However, those heretofore utilized mills have required relatively permanent installation, generally required an operator to wade into the water to install them, and were inoperative during periods when the wind was not blowing. Since the apparatus could not be readily moved from one location to another, the concentration of animals in relatively small area over extended periods of time caused the surrounding area to become fouled with animal droppings. The previously used mills also could not successfully be utilized in areas where there are long periods of no wind and the temperature drops sufficiently to freeze the water during these periods.

It is therefore an object of this invention to provide an agitating means for preventing liquids from freezing. Another object is to provide an apparatus of the above-described type that is easily movable from one location to another. Yet another object of the invention is to provide adjusting and support means whereby the entire agitating apparatus can be readily moved and installed in the water and easily aligned relative to the water and the sometimes sloping bottom upon which the apparatus may rest by an operator positioned at a location apart from the water. A still further object of the invention is to provide an apparatus having a means for agitating the water during periods when the wind is not blowing with sufficient velocity to operate the more conventional types of wind motors.

Figure 1:
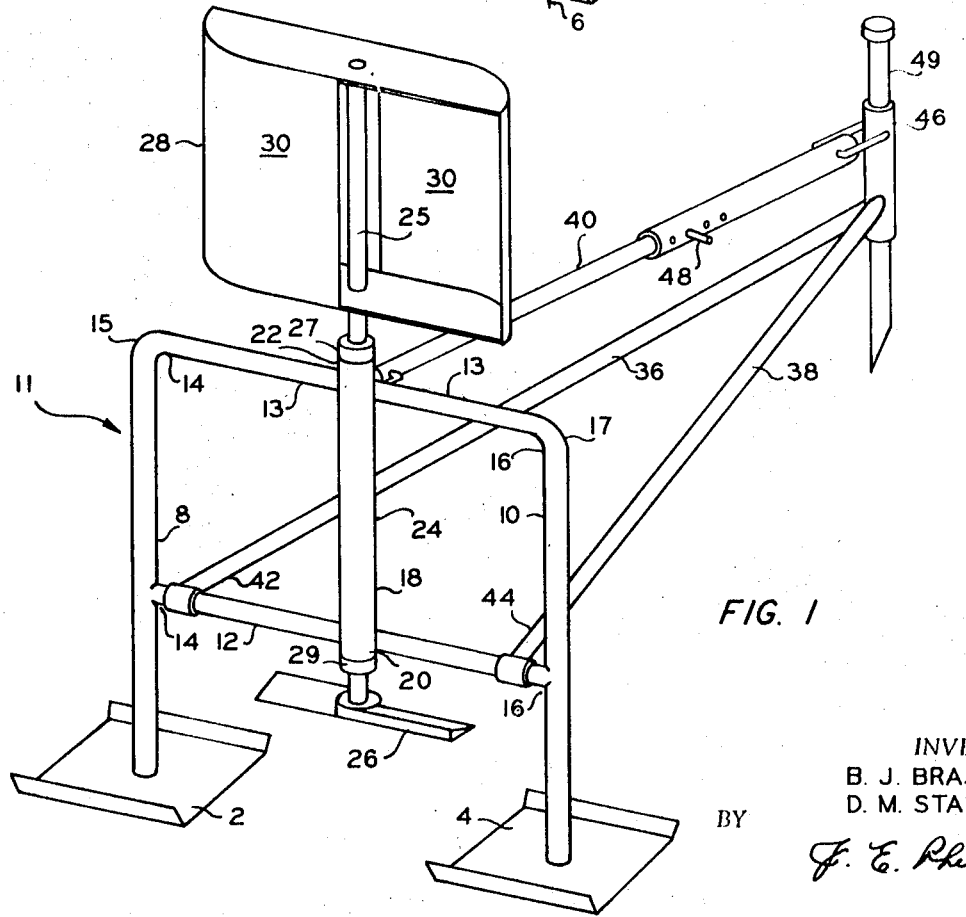

Other aspects objects and advantages of the invention will become apparent from a study of the disclosure, the appended claims and the drawings, which are isometric, diagrammatic views of two presently preferred embodiments of the inventive apparatus. FIG. 1 shows one embodiment adapted for use in ponds or bodies of water having relatively flat bottoms, and FIG. 2 is an embodiment adapted for use in bodies of water located in areas having extended periods of no wind movement.

Referring to FIG. 1, the apparatus has first and second supporting bases 2, 4 which can optionally be a single plate member 3 as shown in FIG. 2, for contacting the bottom of a pond. The supporting bases 2, 4 preferably are formed of metal. First and second spaced-apart supporting legs 8, 10 are readily connected to the supporting bases 2, 4 and extend generally upwardly therefrom. Each leg 8, 10 is connected to the supporting bases and can, as further shown in FIG. 2, be pivotally connected to the supporting bases to permit movement of the legs or bases. A first bracing element 12 having first and second end portions 14 and 16 is connected at each end portion to a separate leg 8, 10 at a location on the legs spaced from the base, thereby forming an apparatus frame 11. Similarly, a second bracing element 13 having first and second end portions 14, 16 is connected at each end portion to the upper ends 15, 17 of supporting legs 8, 10. A housing 18 having first and second end portions 20, 22 and a middle portion 24 is attached at the first and second end portions 20, 22 to first and second bracing elements 12 and 13, preferably at about an equal distance between the supporting legs 8, 10.

A conventional propeller 26 is attached to the first end of shaft 22 positioned within housing 18. Power means such as wind motor 28 is attached to the upper end of a shaft 25 which extends through the housing 18 so as to rotate the shaft 25 and the associated propeller 26 in one direction. An upper seal 27 and lower seal 29 are preferably provided to maintain the positioning of the shaft 25 in the housing 18.

In order that the apparatus can readily be moved by an operator standing on the shore, first, second and third adjusting arms 36, 38, 40, each having first and second end portions 42, 44, are connected to the bracing elements 12 and 13. Each of the first and second adjusting arms 36 and 38 is pivotally connected at the first end portion 42 to the frame 11 adjacent a respective end portion of the first bracing element 12 and extends in a generally common direction outwardly therefrom. The adjusting arms 36, 38 can be pivotally connected to either the legs 8, 10 or to the end portions 14, 16 of the first bracing element 12. The second end portions 44 of the first and second adjusting arms 36 and 38 are preferably attached one to the other as shown to provide an apparatus having greater rigidity and being more easily installed. The third adjusting arm 40 is attached at the first end portion 42 to the second bracing element 13 to provide a moment through which the apparatus can be pivoted in response to movement of the third adjusting arm 40 for altering the attitude of the agitating means relative to the water in which said means operates, the base and the bracing elements 12 and 13.

In order to provide a simply constructed means for maintaining the arms relative one to the other, it is preferred that the second end portions 44 of the arms 36, 38, 40 be connected one to the other and that a pin 49 be attached to the arms and driven into the ground. In order that the third adjusting arm 40 can be attached to the first and second end portions 42 and 44 and be easily movable for adjusting the attitude of the agitating means, it is preferred that said arm 40 be comprised of first and second elements which are extendable and retractable as well as being fixedly attached one to the other for changing the length of said arm 40. The first and second elements can be telescoping one within the other or can be in side-by-side relationship. The maintaining means can be, for example, a friction clamp or a bar 48 that is placed through common openings extending through the elements.

As shown in FIG. 2, support legs 8, 10 can be pivotally attached to a common support base 3 which can additionally be provided with holding elements 6 extending downwardly from a lower surface of the support base for penetrating the bottom of the pond to maintain the base relative to the surface upon which it rests.

Shaft 25 is operatively connected to a power source 48 which can be of any conventional type to provide rotation of the shaft 25 in a single direction. One means which assures that the apparatus continues to function during periods when there is no wind and yet which permits the use of a wind motor as shown in FIG. 1 is a combination of the wind motor with an electric motor 50. Electric motor 50, in addition to being operatively connected to shaft 25, is also connected to a sensing means 52 for actuating the electric motor 50 in response to the termination of rotation of the shaft 25. The sensing means can be attached to the electric motor through a timing means (not shown) so that the electric motor 50 is not actuated for a predetermined interval of time after movement of the shaft is terminated. Short time durations of no wind then will not cause the electric motor 50 to be actuated.

As further shown in FIG. 2, support and aligning members 54 and 56 formed of a plastic material such as polyethylene or polytetrafluorethylene or polyphenylene sulfide can be used as self-lubricating bearings which in turn permit the housing element 18 of FIG. 1 to be omitted. Alternatively, such seals or bearing can be utilized, if desired, in combination with housing 18.

In the operation of the apparatus of the invention, the apparatus is both positioned and erected by an operator on the shore of the pond, for example. While holding the arms 36, 38 and 40, the operator positions the apparatus at a desired location at the water edge and then lowers or slides the base supports into contact with the bottom of the pond to a depth at which the propeller 26 is under water. The pin 49 can then be driven into the ground to maintain the apparatus relative to the bottom of the pond. The bar 48, for example, is then removed and the third adjusting arm is either lengthened or shortened to cause the agitating means to be aligned substantially vertically and the second end portions 44 of the first and second arms 36 and 38 to be supported by the ground. By providing pivotal connections between the legs 8, 10 and the support base 3, as shown in FIG. 2, it is found that the apparatus can easily be installed on a pond bottom, for example, having a high degree of slope, and yet the agitating means can be readily adjusted to operate in a vertical position with the bottom surface of the base 3 in contact with the ground for greater support. The apparatus of the invention can be readily relocated by pulling the pin 49, moving the apparatus to a new location, and repeating the above installation steps.

So long as the wind blows sufficiently hard to rotate the wind motor 28, the shaft 25 and the propeller 26 are turned and function to agitate the water in which they are submerged, thereby preventing the water from freezing. The apparatus of this invention can be provided, as illustrated, with any power source, such as with an electric motor for rotating the propeller. In yet another embodiment, the apparatus can be provided with a combination of a wind motor and an electric motor which is associated with a sensing means. In this embodiment if, for example, the wind ceases blowing for a predetermined period of time, the sensing means causes the electric motor to be actuated. In this construction, the operator is assured against the freezing of the water in the event of calm weather and for this reason need not check the apparatus as frequently. It therefore provides an apparatus that can be utilized in rather remote locations.

Various modifications and alterations of this invention will become apparent to those skilled in the art from the foregoing discussion and accompanying drawings, and it should be understood that the invention is not to be unduly limited thereto.

What is claimed is:

1. An apparatus for agitating a liquid and preventing said liquid from freezing, comprising:
   at least one base;
   first and second spaced-apart supporting legs, each connected to said base and extending generally upwardly therefrom;
   at least one bracing element having first and second end portions and being connected at each end portion to a separate leg, forming an apparatus frame;
   agitating means attached to said bracing element for agitating the liquid;
   first and second adjusting arms each having first and second end portions and each being pivotally connected at the first end portion to the frame adjacent a respective end portion of said bracing element and extending in a generally common direction outwardly therefrom; and
   a third adjusting arm having first and second end portions and being attached at the first end portion to the agitating means at a different elevation from the bracing element, extending in the common direction, and being movable relative to the first and second adjusting arms for altering the attitude of the agitating means.

2. An apparatus as set forth in claim 1 wherein the first and second adjusting arms are each connected at their first end portion to a separate leg of the frame.

3. An apparatus as set forth in claim 1 wherein the first and second adjusting arms are each connected at their first end portion to a separate end portion of the bracing element.

4. An apparatus as set forth in claim 1 wherein the first and second legs are pivotally connected to the base.

5. An apparatus as set forth in claim 2 wherein there are first and second bases with a separate supporting leg attached to each base.

6. An apparatus as set forth in claim 1 wherein the second end portions of the first and second adjusting arms are fixedly attached one to the other.

7. An apparatus as set forth in claim 1 wherein the second end portions of the first, second and third arms are associated with a pin for maintaining said arms.

8. An apparatus as set forth in claim 1 wherein the agitating means comprises:
   a shaft having first and second end portions and middle portion with said middle portion being rotatably attached to the bracing element and the first end of the third adjusting arm;
   a propeller attached to the first end portion of the shaft; and
   means attached to the second end portion of the shaft for rotating the shaft and the associated propeller in one direction.

9. An apparatus as set forth in claim 8 wherein the means for rotating the shaft is a wind motor having at least two blades.

10. An apparatus as set forth in claim 8 wherein the means for rotating the shaft is an electric motor.

11 An apparatus as set forth in claim 8 wherein the means for rotating the shaft is a wind motor and an electric motor, said electric motor being actuated by a sensing means in response to the termination of rotation of the shaft.

UNITED STATES PATENT OFFICE

CERTIFICATE OF CORRECTION

Patent No. 3,603,699         Dated: September 7, 1971

It is certified that error appears in the above-identified patent and that said Letters Patent are hereby corrected as shown below:

The first inventor's name should read

"Buddy Joe Brashear" instead of "Budd Joe Brashear".

Signed and sealed this 25th day of January 1972.

(SEAL)
Attest:

EDWARD M. FLETCHER, JR.              ROBERT GOTTSCHALK
Attesting Officer                    Commissioner of Patents